United States Patent [19]
Zumbrunn et al.

[11] 3,929,636
[45] Dec. 30, 1975

[54] PROCESS FOR CONDITIONING EFFLUENT CONTAMINATED BY ALDEHYDE COMPOUNDS

[75] Inventors: Jean-Pierre Zumbrunn, Saint Gratien, France

[73] Assignee: L'Air Liguide, Societe Anonyme pour l'Etude et l'Exploitation des Procedes, Paris, France

[22] Filed: Dec. 26, 1973

[21] Appl. No.: 428,196

[30] Foreign Application Priority Data
Jan. 5, 1973   France .............................. 73.00286

[52] U.S. Cl. .................................... 210/63; 210/96
[51] Int. Cl.² .......................................... C02C 5/04
[58] Field of Search ................... 210/50, 59, 63, 96

[56] References Cited
UNITED STATES PATENTS

| | | |
|---|---|---|
| 2,311,314 | 9/1940 | Reichert et al. ...................... 210/50 |
| 3,394,080 | 7/1968 | Hoffmann et al. ..................... 210/96 |
| 3,510,424 | 5/1970 | Zumbrunn ............................ 210/63 |
| 3,711,402 | 1/1973 | Zumbrunn ............................ 210/63 |
| 3,715,309 | 2/1973 | Zumbrunn ............................ 210/63 |
| 3,829,379 | 10/1974 | Ishida et al. ......................... 210/59 |

OTHER PUBLICATIONS

Ficek, "KMNO₄ for Cleaner Air and Water, " Paint and Varnish Production, May 1973.
Chemical Abstracts, Vol. 65, 2087h, 1966.
Humphrey et al., "Taste & Odor Control using KMNO₄," Water & Sewage Works, 1962.

*Primary Examiner*—Thomas G. Wyse
*Assistant Examiner*—Peter A. Hruskoci
*Attorney, Agent, or Firm*—Browdy and Neimark

[57] ABSTRACT

A process for the treatment of industrial effluent containing toxic impurities wherein aldehydes are oxidized by a peroxy compound containing for example, the anion $SO_5^{--}$ in the form of Caro's acid or in the form of a salt thereof.

10 Claims, No Drawings

PROCESS FOR CONDITIONING EFFLUENT CONTAMINATED BY ALDEHYDE COMPOUNDS

BACKGROUND OF THE INVENTION

This invention relates to the treatment of industrial effluents containing toxic impurities in the form of soluble organic compounds such as aldehydes and, more particularly, is concerned with a process for the destruction of such impurities by oxidation.

Industrial effluents containing toxic impurities in the form of soluble organic compounds, particularly effluents containing formaldehyde, are discharged by plants which prepare such compounds and by plants which use such compounds as starting materials in the preparation of chemical materials such as plastics materials and photographic materials, and as reagents in tanneries, tawing plants and so on. These compounds are poisonous and their presence in an effluent is undesirable; for example formaldehyde is known to be toxic to aquatic fauna and with its $BOD_5$ of 728 is a heavy load on conventional activated sludge treatment plants to the extent that its concentration must not reach toxic thresholds for the purifying biological agent.

Few industrially viable processes are known for treating effluents containing aldehydes or derivatives thereof. Biological treatment is a possibility if concentrations are low; and absorption on activated carbon is another possibility but it is a slow process and regeneration of the carbon restores the formaldehyde. Incineration may solve the problem but is only economical for high effluent concentrations, being very costly for low effluent concentrations because of the large amounts of water which have to be evaporated.

It is an object of the present invention to provide an industrially applicable process which provides rapid, complete and economical detoxification of effluent contaminated by aldehyde impurities.

SUMMARY OF THE INVENTION

According to the invention there is provided, in a process for treating effluent containing aldehyde impurities the improvement which comprises oxidizing the impurities with a peroxy compound.

Completion of the treatment of the impurities with the peroxy compound is advantageously detected electrochemically or analytically.

DESCRIPTION OF THE PREFERRED EMBODIMENTS

The peroxy compound can be inter alia a compound containing the anion $SO_5^{--}$, the preferred peroxy compound of this type being more particularly either Caro's acid, $H_2SO_5$, as an aqueous solution of the free acid, or a salt of Caro's acid. The action of Caro's acid has been studied in connection with the detoxification of formaldehyde-containing effluent, formaldehyde being the commonest aldehyde contaminant found in effluents. The action is, however, the same on other aldehydes. The basic chemical reaction which occurs can be represented by the scheme:

$$R-CHO + H_2SO_5 \rightarrow R\text{-}COOH + H_2SO_4$$

If the reaction proceeds in an alkaline medium, the salts of the corresponding acid are produced and they are far less toxic than the contaminant before oxidation. The $SO_5^{--}$ anion is generally used in laboratories and in industry either in the form of aqueous solutions of Caro's acid salified to varying extents by ammonium or potassium or sodium ions or in the form of a mixture of crystallized salts whose active constituent is potassium monopersulphate, $HKSO_5$. Preferably, the oxidant of this type used in the present invention is chosen from the group consisting of Caro's acid and its salts. Such oxidants can be prepared by reacting hydrogen peroxide with oleum or sulphuric acid or chlorosulfonic acid or by the hydrolysis of the dipersulphates $S_2O_8$.

The $SO_5^{--}$ anion results in complete conditioning when placed in contact with pure aqueous solutions of an aldehyde or with effluent containing aldehydic compounds.

In another embodiment of the invention, the effluent is treated with an association of reagents which are adapted to form in situ the peroxymonosulfuric anion $SO_5^{--}$, the association being embodied by a compound which evolves active oxygen when mixed with sulphuric acid or oleum or chlorosulphonic acid. The oxygen-evolving compound is advantageously chosen from the group whose basis is hydrogen peroxide; but other active oxygen-evolving compounds of use in the process of the invention are mineral and organic hydroperoxidates, such as perborates, alkaline percarbonates, perpyrophosphates, urea peroxide and alkaline and alkaline-earth mineral peroxides, and dipersulfuric acid and its salts or a mixture of hydrogen peroxide and sulphuric acid which give very good results.

The embodiments of the invention which use Caro's acid as the reagent for conditioning the effluent, which may be, for example, water polluted with aldehyde is very simple and the treatment can proceed at ambient temperature. Thus, the oxidant can be mixed with the effluent at a neutral or moderately alkaline pH which is preferably at least 9 and most preferably is between about 9 and about 10. The treatment time depends on the pH, the reaction time being determined mainly by the pH since breakdown of the formaldehyde proceeds more rapidly as the pH is more alkaline. pH values much below 9 are less desirable due to a slowing-down of the oxidation reaction.

The process of the invention is very economical since only small amounts of oxidant are needed for it. Amounts near the stoichiometric ratio plus the usual 10% or so excess of reagent required for any chemical reaction used on an industrial scale are adequate so that the use of oxidizing reagent in an oxidant/aldehyde molar ratio of at least 1, preferably around 1.1, is sufficient for total destruction of the aldehyde compounds.

The oxidant can be introduced all at once or in two or more stages.

The process of the invention can be used for treating effluents whose aldehyde compound concentration ranges from 0.1 mg/l to several tens of g/l.

The main features of the detoxifying process were studied in a number of experiments using an aqueous formaldehyde solution adjusted to 20 mg/l of HCHO which corresponds to 20 ppm, the solution having an initial pH of 4 to 5. The reaction time at ambient temperature was measured in dependence upon the pH and the results obtained are given in the following Table.

TABLE

| pH OF TREATMENT | TIME OF ½ REACTION (10 mg/l of HCHO REMAINING) | TIME FOR TOTAL PURIFICATION. RESIDUAL HCHO <0.1 mg/l |
|---|---|---|
| 12 | a few seconds | <1 min |
| 11 | " | 2 min |
| 10 | " | 4 min |
| 9 | 30 seconds | 30 min |
| 8 | 1 min | 0.7 mg/l remains after 45 min 0.4 mg/l remains |

TABLE-continued

| pH OF TREATMENT | TIME OF ½ REACTION (10 mg/l of HCHO REMAINING) | TIME FOR TOTAL PURIFICATION. RESIDUAL HCHO <0.1 mg/l |
|---|---|---|
| 7 | 3 min | 1.7 mg/l remains after 45 min 1.4 mg/l remains after 60 min |

It can be seen that treatment at a pH of about 10 at ambient temperature gives rapid and total oxidation in a few minutes.

The oxidation reaction can be followed electrochemically by means of a pair of redox electrodes since a formaldehyde solution at any concentration acts on a pair of reference platinum electrodes to produce a negative response of from −40 to −80 mV. On the addition of Caro's acid, a powerful oxidant, there is a shift to a positive potential whose absolute value is proportional to the acid concentration. As the formaldehyde concentration decreases, the acid concentration decreases proportionally, becoming stable upon completion of the oxidation reaction. Since in practice a slight excess of Caro's acid will be used, stabilization of the potential at a positive value, which is usually between + 100 and + 300 mV, is an indication that the conditioning reaction is complete and that the treated effluent can be discharged.

Some details will now be given about the analytical methods used in the following Examples.

Formaldehyde in a concentrated solution, i.e. at least 50 mg/l can be determined using hydrogen peroxide in an alkaline medium. The hydrogen peroxide converts formaldehyde into formic acid. If the reaction medium contains a known quantity of sodium hydroxide as well as the peroxide, the formic acid evolved consumes some of this. The quantity of formaldehyde involved can be determined by return acidimetric determination. The reaction medium should be heated in a water bath for 5 minutes and a relatively large excess of hydrogen peroxide should be used.

Weak concentrations of formaldehyde, on the other hand, can be determined by a colorimetric method using chromotropic acid. Hot chromotropic acid 4,5-dihydro naphthalene -2,7-disulfonic acid in a very sulfuric medium turns a reddish-violet color in the presence of formaldehyde. The intensity of color can be measured by spectrophotometry using light with a wavelength of 570 mμ. A check was made to ensure that this method was not disturbed by oxidants such as Caro's acid at the concentrations likely to be found in detoxifying operations. The sensitivity of the method is such that formaldehyde contents which are definitely less than 0.1 mg/l can be detected before and after conditioning. However, since the validity of values below 0.1 mg/l is not always certain in an industrial environment. The results obtained were recorded as being better than 0.1 mg/l even if the concentration actually found was lower than this or even nil.

If the effluent contains colored impurities which may affect determination, it may be advisable to distill the effluent or steam distill it. The medium should be slightly acidified beforehand by the addition of 2 ml of N sulphuric acid per 100 ml after previous neutralization. In a neutral and alkaline medium determinations of the distillate are always low.

By way of non-limitative example there will now be described the performance of various kinds of oxidizing detoxification using Caro's acid in accordance with the process of the invention.

EXAMPLE 1

1 liter of an aqueous (20 mg/l) formaldehyde solution whose natural pH was from 4 to 5 was treated at ambient temperature by the addition of 0.42 ml of a 200 g/l Caro's acid solution which corresponded to a molar ratio $H_2SO_5/HCHO$ of 1.1.

The pH was raised to 10 by the addition of an appropriate quantity of caustic soda. The oxidation reaction was followed by consecutive chromotropic acid determinations. After 4 minutes, formaldehyde ceased to be detectable, i.e. the formaldehyde content was below 0.1 mg/l.

EXAMPLE 2

The same solution as was used in Example 1 was treated under the same conditions. The oxidizing conditioning reaction was followed by means of the indications given by a pair of redox platinum electrodes using calomel as a reference electrode.

The potentials corresponding to the pattern of oxidation were as follows:

0 minutes corresponding to the addition of $H_2SO_5$: potential +380 mV after 1 min 2.3 mg/l of formaldehyde remained: potential +360mV
after 2 min 0.7 mg/l of formladehyde remained: potential +310mV
after 3 min 0.2 mg/l of formaldehyde remained: potential +270mV
after 4 min<0.1 mg/l of formaldehyde remained: potential +260mV
after 5 min<0.1 mg/l of formaldehyde remained: potential +260mV
after 10 min<0.1 mg/l of formaldehyde remained: potential +260mV
after 30 min<0.1 mg/l of formaldehyde remained: potential +260mV After the 30-minute period (which may sometimes last longer) the potential gradually decreased as the oxidizing capacity of the Caro's acid breaks down naturally because of spontaneous breakdown of excess reagent.

EXAMPLE 3

1 liter of an aqueous solution containing 1.5 g of formaldehyde was treated at ambient temperature with 32.5 ml of a 200 g/l Caro's acid solution which corresponded to an $H_2SO_5/HCHO$ molar ratio of 1.1.

The pH was raised to 9 by the addition of NaOH, as checked on a pH meter.

After 45 minutes contact time no more formaldehyde was detectable by the chromotropic acid method, i.e. the formaldehyde content was less than 0.1 mg/l.

EXAMPLE 4

The same solution as was used in Example 3 was treated under the same conditions. The redox potentials found using a pair of platinum electrodes with a colomel reference electrode gave the following indications:

0 minutes corresponding to the addition of $H_2SO_5$; potential + 500 mV

| | | |
|---|---|---|
| After 10 minutes | potential | +460mV |
| After 15 minutes | " | +360mV |
| After 20 minutes | " | +280mV |
| After 25 minutes 14 mg/l of formaldehyde remained | " | +200mV |
| After 30 minutes 0.2 mg/l of formaldehyde remained | " | +160mV |
| After 45 minutes <0.1 mg/l of formaldehyde remained | " | +140mV |
| After 60 minutes <0.1 mg/l of formaldehyde remained | " | +140mV |

I claim:

1. A process for treating industrial effluent containing aldehyde impurities, comprising:
   adjusting the pH of said effluent to a value of at least about 9;
   reacting the aldehyde impurities in said effluent with an oxidizing reagent comprising the peroxymonosulfuric anion, $SO_5^{--}$, by mixing said effluent with a compound or compounds which form the peroxymonosulfuric anion, $SO_5^{--}$, in said effluent, said oxidizing reagent being present in the effluent in a molar ratio of oxidant/aldehyde at least equal to 1.

2. A process in accordance with claim 1, wherein said compound is monopersulfuric acid or a salt thereof.

3. A process in accordance with claim 1, wherein said compound is dipersulfuric acid or a salt thereof.

4. A process in accordance with claim 1, wherein said reacting step comprises treating said effluent with an association of compounds which form the peroxymonosulphuric anion, $SO_5^{--}$, in situ by chemical reaction.

5. A process in accordance with claim 4 wherein said association of compounds is a mixture of hydrogen peroxide and sulphuric acid.

6. A process according to claim 1, wherein the pH of the effluent is at a pH between about 9 and 10.

7. A process according to claim 1, wherein the effluent treatment proceeds at ambient temperature.

8. A process according to claim 1, wherein the oxidant is introduced to the effluent in a quantity such that the oxidant/aldehyde molar ratio is about 1.1.

9. A process according to claim 1, wherein completion of the reaction is determined electrochemically or analytically.

10. A process according to claim 9, wherein completion of the reaction is indicated by the potential of a pair of redox electrodes stabilized at a steady positive value.

* * * * *

UNITED STATES PATENT OFFICE
CERTIFICATE OF CORRECTION

PATENT NO. : 3,929,636
DATED : December 30, 1975
INVENTOR(S) : Jean-Pierre Zumbrunn It is certified that error appears in the above-identified patent and that said Letters Patent are hereby corrected as shown below:

Title page, line 2, "Zumbrunn et al." should read --Zumbrunn--

Title page, [73] Assignee: should read:
--L'Air Liquide, Societe Anonyme pour l'Etude et l'Exploitation des Procedes Georges Claude, Paris, France--

Column 6, claim 6, line 2, after "and" insert --about--

Signed and Sealed this twentieth Day of April 1976

[SEAL]

Attest:

RUTH C. MASON
*Attesting Officer*

C. MARSHALL DANN
*Commissioner of Patents and Trademarks*